No. 859,731.
PATENTED JULY 9, 1907.
S. A. BEYLAND.
ELECTRICAL CONDENSER.
APPLICATION FILED JAN. 10, 1907.
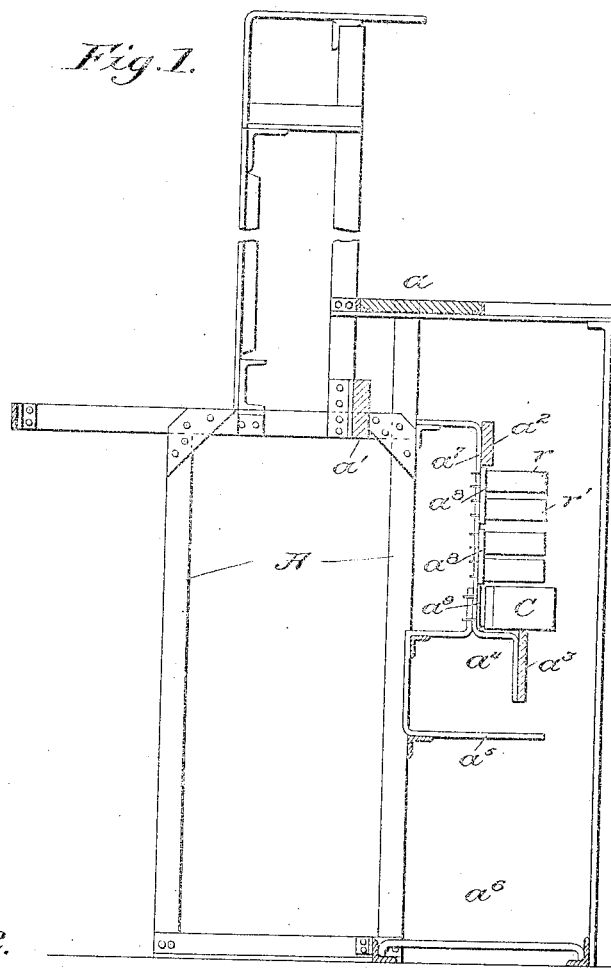
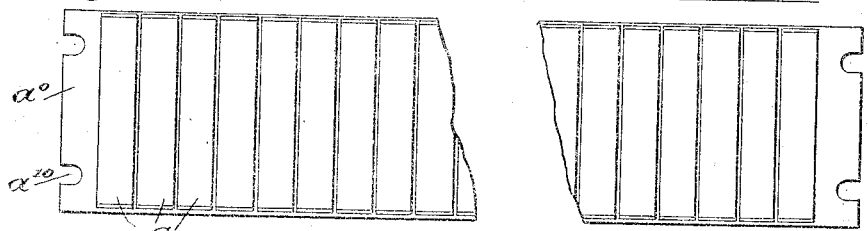
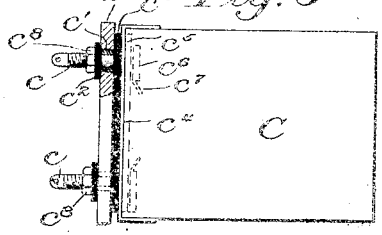
Witnesses:
Inventor:
Sidney A. Beyland
by Edward C. Clement
Atty.

UNITED STATES PATENT OFFICE.

SIDNEY A. BEYLAND, OF ELYRIA, OHIO, ASSIGNOR TO THE DEAN ELECTRIC COMPANY, OF ELYRIA, OHIO, A CORPORATION OF OHIO.

ELECTRICAL CONDENSER.

No. 859,731.      Specification of Letters Patent.      Patented July 9, 1907.

Application filed January 10, 1907. Serial No. 351,716.

*To all whom it may concern:*

Be it known that I, SIDNEY A. BEYLAND, a citizen of the United States, residing at Elyria, in the county of Lorain and State of Ohio, have invented certain new and useful Improvements in Electrical Condensers, of which the following is a specification, reference being had therein to the accompanying drawings.

My invention relates to electrical condensers, and has for its object to simplify the same and at the same time facilitate the arrangement and connection thereof.

The invention is particularly applicable to condensers used in telephone exchanges, and comprises as its essential feature a type of combined contact and securing bolt, by means of which the condenser can be held upon a suitable rack.

More specifically stated my invention contemplates a condenser in the usual containing shell or casing, with the terminals of the tin foil sheets brought up to two bolts which pass through the cover of the casing but are insulated therefrom. These bolts protrude to a sufficient extent to be passed through a member of the switchboard rack or frame, and secured on the other side thereof by means of nuts. The condenser is thus held end on to the frame, in the same manner as the tubular relays which are now so common and well known. Connection from the condenser terminals is easy and direct, and there is no danger as heretofore of breaking or disengaging the terminals accidentally in handling.

My invention is illustrated in the accompanying drawings, in which

Figure 1 is a sectional view of a switchboard frame, Fig. 2 is a face view of a mounting strip, and Fig. 3 is a side view of a condenser, showing a portion of the mounting strip in section.

Referring to the drawings and particularly to Fig. 1, A is the frame of a switchboard, which may be of any desired type, but in the type shown has the following features: $a$ is the multiple cable support; $a'$ is the cord rack; $a^2$ is the rack for the operator's equipment; $a^3$ is the connecting rack; $a^4$ is a space for power wires; $a^5$ is the support for miscellaneous cables, and $a^6$ is the answering jack cable space. Between the operator's rack and the connecting rack or power wires are vertical members $a^7$, carrying transverse mounting strips $a^8$ upon which are mounted the relays $r$, which are shown only in outline. All of the construction so far described is of course old and well known.

Below the relays, and supported also upon the vertical members $a^7$, I secure the transverse mounting strip $a^9$, which is similar to the strip $a^8$, but drilled or punched to receive the projecting terminal bolts of the condensers C. The mounting strip, with a plurality of condensers in plan view thereon is shown in Fig. 2. It has end slots $a^{10}$ through which screws are tapped into the vertical members $a^7$ so as to hold this strip in position. The location of the condensers below the relays is convenient for this reason, that it is possible to have the entire row rest upon the edge of the vertical panel of the connection rack $a^3$.

The construction of one condenser is best shown in Fig. 3. $c$ are the terminal bolts, which are bushed at $c'$ where they pass through the mounting strip $a^9$, and are further insulated therefrom by the washers $c^2$ and the interposed strip $c^3$, of rubber or fiber. Inside the cap $c^4$ of the condenser is another insulating strip $c^5$, and the head of each bolt $c$ lies within and against this strip $c^5$, as shown at $c^6$. Each head is fitted with a terminal $c^7$, to which the wires from the condenser leaves are soldered, or the connection effected in any other desired manner prior to sealing up the can. Externally the bolts $c$ are threaded to receive the securing nuts $c^8$.

In the drawings I have shown only two terminals on the can. In practice I frequently use four, so as to have a pair of condensers in the same can. This is particularly convenient in the case of common battery metallic circuits, where the capacities are used in pairs in the opposite sides of the circuits. Such a condenser is made of two separate rolled type tin foil and paper condensers, each having its respective leaves brought out to its own pair of terminals, so that one can holds the two condensers.

It is apparent that divers and sundry changes can be made in the form, proportions, and other non-essential features without departing from the spirit of my invention; and I desire it understood that all such non-essentials are within the scope of my claims.

Having thus described my invention what I claim and desire to secure by Letters Patent is:

1. The combination of a supporting rack or frame, with a condenser having projecting terminals adapted to engage said frame so as to mechanically secure the condenser thereto, while serving at the same time for its electrical connection, substantially as described.

2. The combination of a frame, a mounting strip on the frame, and a plurality of condensers having insulated terminals adapted to engage said mounting strip to mechanically hold the condensers thereon, substantially as described.

3. The combination of a frame, a mounting strip, thereon, openings in said mounting strip, and a condenser having projecting bolts adapted to pass through said openings, with nuts threaded thereon to secure the condenser to the strip thereby, said bolts being insulated from the securing strip, and constituting also the electrical terminals of the condenser, substantially as described.

4. In a telephone equipment, the combination of a supporting frame, a mounting strip secured thereto, and a condenser secured on the mounting strip, said condenser having a length greater than its width or thickness, and having insulated projecting electrical and mechanical terminals extending from one end of its case, and means to secure said terminals to but insulate them from the mounting strip, substantially as described.

5. The combination of a frame, a mounting strip forming a part of said frame, and a condenser supported on said mounting strip, said condenser comprising a plurality of capacity elements, an inclosing casing surrounding said elements, an end or cover on said casing adapted to carry the weight thereof and the capacity elements, a plurality of bolts secured to but insulated from said end or cover, and means for securing said bolts to but insulating them from the mounting strip, substantially as described.

In testimony whereof I affix my signature in presence of two witnesses.

SIDNEY A. BEYLAND.

Witnesses:
ROY H. MANSON,
A. J. ROBERTS.